United States Patent
Hughes et al.

(10) Patent No.: US 10,707,040 B2
(45) Date of Patent: Jul. 7, 2020

(54) POWER DISTRIBUTION SYSTEM WITH SNUBBER PLATE

(71) Applicant: GE Aviation Systems Limited, Gloucestershire (GB)

(72) Inventors: Lewis Hughes, Cheltenham (GB); Adrian John Hughes, Quedgeley (GB); John Michael Brett, Tewkesbury (GB)

(73) Assignee: GE Aviation Systems Limited, Gloucestershire (GB)

( * ) Notice: Subject to any disclaimer, the term of this patent is extended or adjusted under 35 U.S.C. 154(b) by 0 days.

(21) Appl. No.: 15/953,520

(22) Filed: Apr. 16, 2018

(65) Prior Publication Data

US 2019/0267204 A1   Aug. 29, 2019

(30) Foreign Application Priority Data

May 25, 2017 (GB) .................................. 1708377.5

(51) Int. Cl.
| | | |
|---|---|---|
| *H01H 9/02* | (2006.01) | |
| *H01H 71/02* | (2006.01) | |
| *H01H 1/58* | (2006.01) | |
| *H01H 73/08* | (2006.01) | |
| *H02B 1/056* | (2006.01) | |
| *H02B 1/20* | (2006.01) | |

(52) U.S. Cl.
CPC ...... *H01H 71/0264* (2013.01); *H01H 1/5866* (2013.01); *H01H 71/0207* (2013.01); *H01H 73/08* (2013.01); *H02B 1/056* (2013.01); *H02B 1/20* (2013.01); *B64D 2221/00* (2013.01)

(58) Field of Classification Search
CPC .......... H01H 71/0207; H01H 71/0264; H01H 1/5866
USPC ......................................................... 335/202
See application file for complete search history.

(56) References Cited

U.S. PATENT DOCUMENTS

| | | | |
|---|---|---|---|
| 3,593,235 A | * | 7/1971 | Nicol ................... H01H 13/023 335/186 |
| 4,720,769 A | | 1/1988 | Raabe et al. |
| 5,973,914 A | | 10/1999 | Rose et al. |
| 6,002,580 A | | 12/1999 | Le Vantine et al. |
| 6,105,091 A | | 8/2000 | Long |
| 6,315,580 B1 | | 11/2001 | Hurtubise et al. |
| 6,317,311 B1 | | 11/2001 | Middlehurst et al. |
| 6,530,811 B1 | | 3/2003 | Padulo et al. |
| 6,993,417 B2 | | 1/2006 | Osann, Jr. |

(Continued)

FOREIGN PATENT DOCUMENTS

| | | |
|---|---|---|
| CN | 1234539 A | 11/1999 |
| CN | 204517993 U | 7/2015 |

(Continued)

OTHER PUBLICATIONS

Chinese Patent Office, Office Action re Chinese Application No. 201810514359.9, dated Dec. 23, 2019, 6 pages, China.

*Primary Examiner* — Alexander Talpalatski
(74) *Attorney, Agent, or Firm* — McGarry Bair PC

(57) ABSTRACT

An apparatus and method managing a circuit breaker in a power distribution system unit. The power distribution system unit can include a housing with an internal bus structure, a door assembly which includes at least one plug received in a socket. A snubber plate is positioned at the socket and includes an aperture through which the plug can be received.

20 Claims, 7 Drawing Sheets

(56) References Cited

U.S. PATENT DOCUMENTS

| | | | |
|---|---|---|---|
| 8,094,436 B2 | 1/2012 | Mills et al. | |
| 8,369,069 B2 | 2/2013 | Osternack et al. | |
| 8,559,149 B2 | 10/2013 | Wavering et al. | |
| 8,649,160 B2 | 2/2014 | Mills et al. | |
| 8,753,129 B2 * | 6/2014 | Worley | H01R 13/04 |
| | | | 439/31 |
| 9,197,040 B2 | 11/2015 | Mills et al. | |
| 9,270,090 B2 | 2/2016 | Mills et al. | |
| 9,276,387 B2 | 3/2016 | Mills et al. | |
| 9,312,674 B2 | 4/2016 | Mills et al. | |
| 9,979,163 B2 * | 5/2018 | Meux | H01H 71/0264 |
| 2010/0296229 A1 * | 11/2010 | Meux | H02B 1/056 |
| | | | 361/605 |
| 2011/0235244 A1 | 9/2011 | Mills et al. | |
| 2012/0285950 A1 | 11/2012 | Guering | |
| 2015/0062786 A1 | 3/2015 | Mills et al. | |
| 2016/0079009 A1 | 3/2016 | Weaver et al. | |
| 2016/0105003 A1 * | 4/2016 | Meux | H01H 71/0207 |
| | | | 361/631 |

FOREIGN PATENT DOCUMENTS

| | | |
|---|---|---|
| JP | 2011082344 A | 4/2011 |
| WO | 2000031844 A1 | 6/2000 |

\* cited by examiner

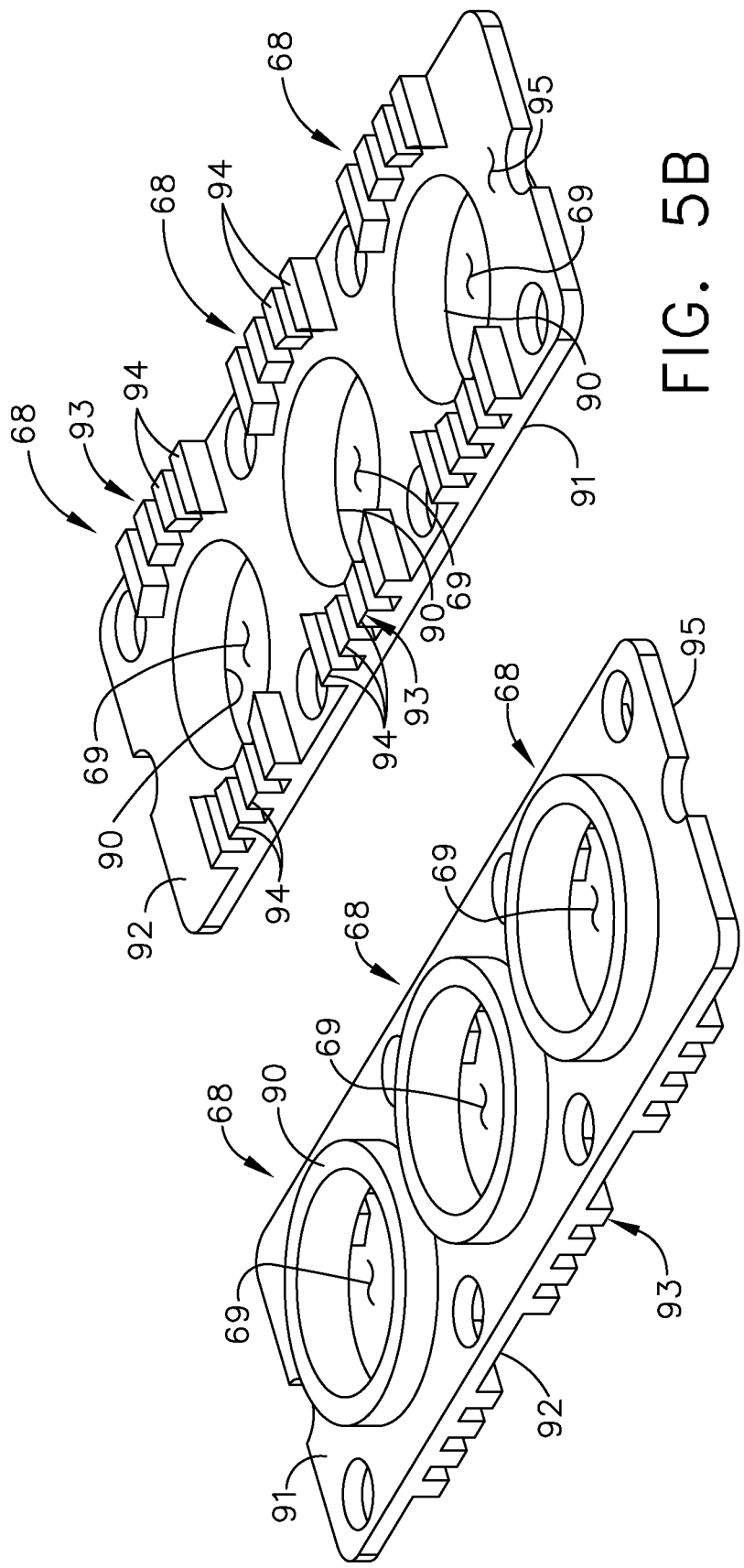

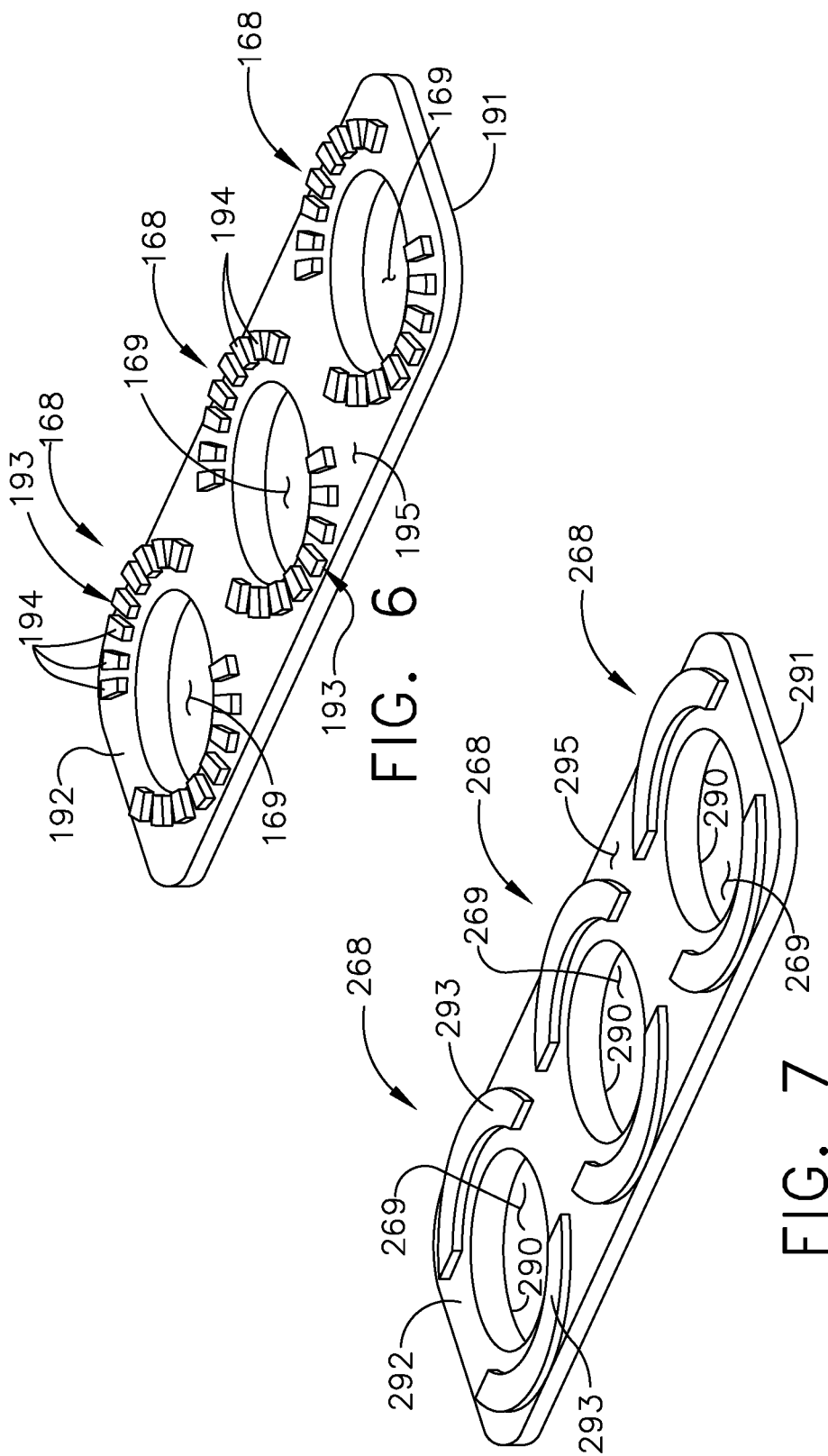

POWER DISTRIBUTION SYSTEM WITH SNUBBER PLATE

BACKGROUND OF THE INVENTION

Commercial aircraft typically include an electrical power distribution system. The purpose of the electrical power distribution system is to distribute electricity to the loads on the aircraft, protect wires and loads from hazards, and to route the most appropriate power source to each load. The electrical power distribution system can include power management panels used to route the power from an electrical power source to wherever an electrical load is required. The power management panels can include panel doors configured to house a plurality of circuit breakers, both wired and plug in.

The circuit breakers are traditionally hard mounted to a sheet metal door via door panel cut outs and relevant fasteners. Assembly requires a wired assembly on an inside portion of the door panel with an outer portion housing a circuit breaker fuse. Assembly of a traditional power management panel includes a large amount of wiring which can contribute to the total weight. For large aircraft the total weight of the power management panel can be up to 150 lbs. Replacing a circuit breaker fuse includes opening the door panel, an unwiring a minimum of three breakers to gain access to the breaker in need of replacing. Upon replacement each disconnected breaker requires retesting upon completion of the replacement of the defective circuit breaker fuse.

BRIEF DESCRIPTION OF THE INVENTION

In one aspect, the present disclosure relates to a power distribution system unit comprising a housing with an internal bus structure, a door assembly hinged to the housing and having an internal side and an external side wherein the internal side is accessible when the door assembly is in an open position and is inaccessible when the door assembly is in a closed position, the door assembly having a set of printed circuit boards (PCBs) mounted to the internal side, the set of PCBs having at least one socket, a set of circuit breakers having an operator in a conical portion and at least one plug disposed opposite the operator, the at least one plug received in the at least one socket and the conical portion extending through the external side, and a snubber plate having at least one aperture and a grommet surrounding the at least one aperture, and secured to the external side, wherein the conical portion extends through the at least one aperture in the snubber plate and retained therein by the grommet.

In another aspect, the present disclosure relates a door assembly for a power distribution system unit comprising a panel having an internal side and an external side, a set of printed circuit boards (PCBs) mounted to the internal side, the set of PCBs having at least one socket, a set of circuit breakers having an operator in a conical portion and at least one plug disposed opposite the operator, the at least one plug received in the at least one socket and the conical portion extending through the external side, and a snubber plate having at least one aperture and a grommet surrounding the at least one aperture, and secured to the external side, wherein the conical portion extends through the at least one aperture in the snubber plate and retained therein by the grommet.

In another aspect, the present disclosure relates to a method of managing circuit breakers in a power distribution system unit, comprising mounting a set of circuit breakers having an operator in a conical portion and at least one plug disposed opposite the operator to a set of printed circuit boards (PCBs) having at least one socket by receiving the at least one plug in the at least one socket, mounting the set of PCBs to an internal side of a door panel with the conical portion extending through an external side of the door panel, and securing a snubber plate to the external side, the snubber plate having at least one aperture and a grommet surrounding the at least one aperture, with the conical portion extending through the at least one aperture in the snubber plate and retained therein by the grommet.

BRIEF DESCRIPTION OF THE DRAWINGS

In the drawings:

FIG. 5A is a grommet for the snubber plate of FIG. 4.

FIG. 5B is a grommet according to a second aspect of the disclosure described herein for the snubber plate of FIG. 4.

FIG. 6 is a grommet according to another aspect of the disclosure described herein for the snubber plate of FIG. 4.

FIG. 7 is a grommet according to another aspect of the disclosure described herein for the snubber plate of FIG. 4.

DETAILED DESCRIPTION OF THE INVENTION

Figure 1:
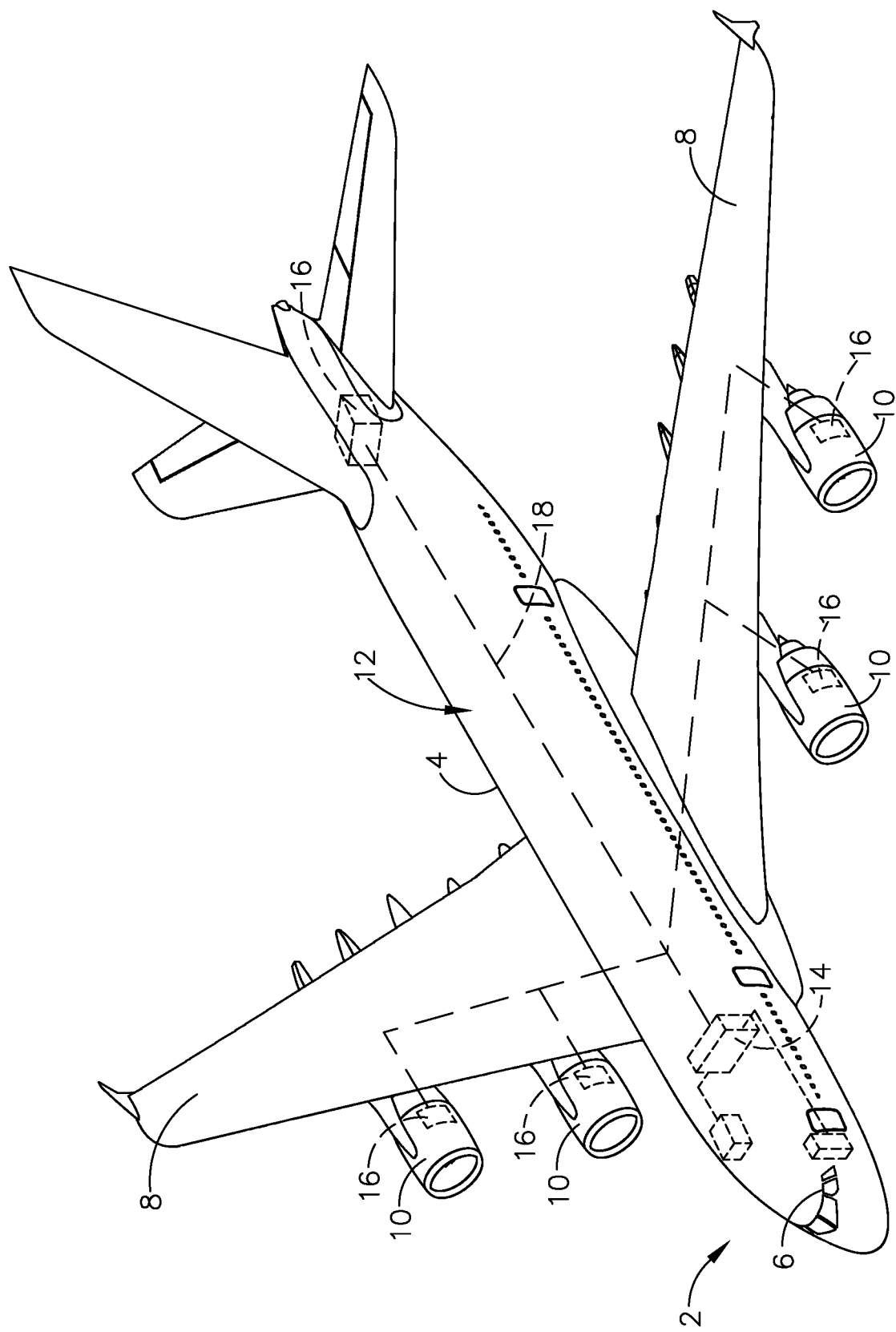
FIG. 1 is a schematic isometric diagram of an aircraft with a power distribution system.

Aspects of the present disclosure are directed to a power distribution system with a snubber plate, particularly for a power distribution system for a commercial aircraft. For purposes of illustration, the present disclosure will be described with respect to an aircraft power distribution system. It will be understood, however, that the present disclosure is not so limited and can have general applicability in non-aircraft applications, such as other power distribution applications.

Traditionally circuit breakers for a power management unit are hard mounted to a door panel via door panel cut outs. The circuit breakers are wired up on an inner side of the door panel where a bus bar is fitted to complete the assembly. A circuit breaker fuse is then fitted from the rear of the door panel with a neck portion that trips the breaker protruding through from the rear to the front of the door. A fixing nut is then fitted onto this section from the front that clamps the breaker to the door. The circuit breaker fuse can indicate when a fuse has been tripped. In this traditional process, a large amount of wiring is required on the inner side of the door panel. When a circuit breaker requires replacement, at least three breakers need to be unwired, rewired, and tested upon replacement of a single circuit breaker.

Rapidly changing technology has resulted in commercial airliners requiring increased functionality and a minimum amount of spare capacity to ensure the capability of adding to the existing power management unit. Space on a commercial aircraft is very limited, so it is beneficial to decrease the amount of wiring required for the power management unit allowing increased breaker packing density to ensure optimum spare capacity.

Aspects of the present disclosure minimize the wiring required in a power management unit and in doing so also minimize labor costs and replacement time for circuit breakers at the power management unit.

As used herein "a set" can include any number of the respectively described elements, including only one element. Additionally, all directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an aircraft 2 which can also include a fuselage 4, a cockpit 6 positioned in the fuselage 4, and wing assemblies 8 extending outward from the fuselage 4. The aircraft 2 can also include multiple engines, including turbine engines 10 which by way of non-limiting example can be turbojet engines, turbofan engines, or turboprop engines. While a commercial aircraft 2 has been illustrated, it is contemplated that aspects of the disclosure described herein can be used in any type of aircraft 2. Further, while two turbine engines 10 have been illustrated on each of the wing assemblies 8, it will be understood that any number of turbine engines 10 including a single turbine engine 10 on the wing assemblies 8, or even a single turbine engine mounted in the fuselage 4 can be included.

A power distribution system 12 is illustrated in phantom. A power distribution system unit 14 can be coupled to at least one generator 16 by a main power feed 18 in order to receive electrical power. It is contemplated that the power distribution unit 14 can be coupled to multiple generators 16 as illustrated. The power distribution unit 14 can then distribute power throughout the aircraft depending on load requirements for different operating systems. It should be understood that other unit arrangements for different aircraft engine arrangements would also benefit from the disclosure discussed herein and that the exemplary power distribution system 12 is for illustrative purposes only and not meant to be limiting.

Figure 2:
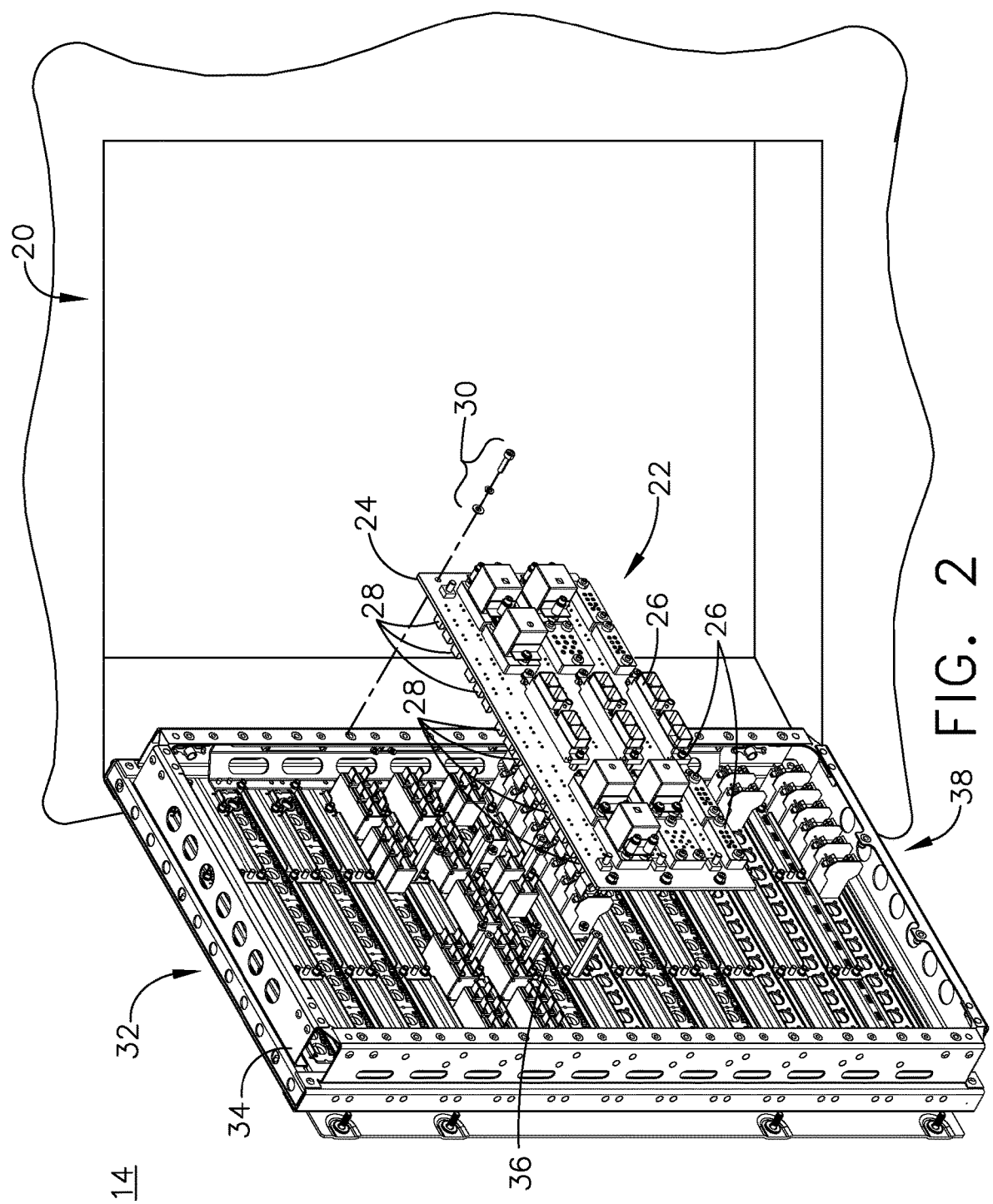
FIG. 2 is an isometric rear view onto an open door of a power distribution unit of the power distribution system from FIG. 1.

FIG. 2 is an isometric view of the power distribution system unit 14 including a housing 20 in which at least one internal bus structure 22 is provided. The housing 20 is schematically illustrated, and can include any number of wiring used to connect the internal bus structure 22 to the main power feed 18. The internal bus structure 22 can include, but is not limited to, at least one printed circuit board (PCB) 24. Components 26 mounted or connected to the PCB 24 can include, but are not limited to wires, bus-bars, conductors, resistors, voltage regulators, antennas, central processing units, and other typical PCB components. At least one circuit breaker socket 28 is mounted to the PCB 24.

A door assembly 32 includes a door panel 34 mounted to the housing 20 to provide access to the internal bus structure 22. An internal side 36 of the door panel 34 is accessible when the door assembly 32 is in an open position 38 as illustrated. The PCB 24 is mounted to the door assembly 32 with fasteners 30, which can be, in one non-limiting example, a nut and bolt fastener.

Figure 3:
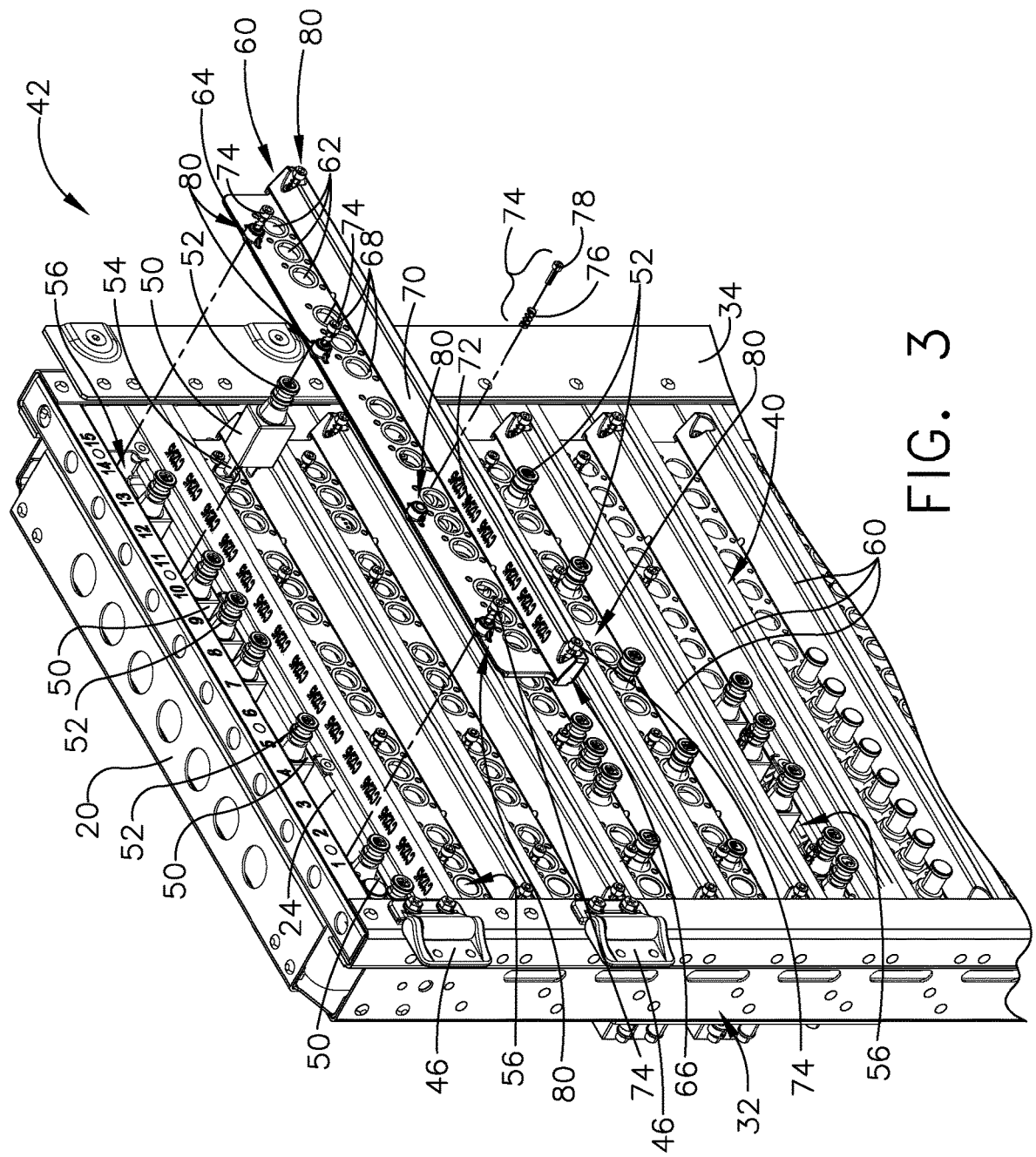
FIG. 3 is an enlarged isometric front view of the door of the power distribution unit of FIG. 2 including a snubber plate and circuit breakers.

Turning to FIG. 3, an external side 40 of the door panel 34 with the door assembly 32 in a closed position 42. The housing 20 is removed for clarity. The door assembly 32 can be coupled to the housing 20 with a set of hinges 46. It is further contemplated that the door assembly 32 is hingedly mounted to an external portion (not shown) of the housing 20.

A set of circuit breakers 50 including an operator 52 and at least one plug 54 disposed opposite the operator are mounted to the PCB 24 through a horizontal opening 56 in the door panel 34. The door assembly 32 can include a plurality of circuit breakers 50 within a single horizontal opening 56. It is further contemplated that the door assembly 32 includes a plurality of horizontal openings 56.

At least one snubber plate 60 is mounted to the external side 40 of the door panel 34 such that the snubber plate 60 covers the horizontal opening 56. It is contemplated that a plurality of snubber plates 60 are mounted to the external side 40 of the door panel 34 at each of the plurality of horizontal openings 56. Each snubber plate 60 includes at least one aperture 62. In the illustrated exemplary snubber plates 60, the apertures 62 are circular, however it is contemplated that the apertures can be of any shape suited for receiving the operator 52 of the circuit breaker 50.

A snubber plate 60 is partially exploded from the external side 40 of the door panel 34. The snubber plate 60 includes a vertical panel 64 in which a rank of apertures 62 is provided and a horizontal panel 66 extending horizontally from the vertical panel 64. The circuit breakers 50 are arranged to be in registry with the rank of apertures 62. A grommet 68 includes a second aperture 69 corresponding to each aperture 62 of the snubber plate 60. A label plate 70 carrying indicia 72 is located on the horizontal panel 66. In the partially exploded view a fastening component, by way of non-limiting example a spring loaded captive screw 74 with a spring 76 and screw 78, can couple the snubber plate 60 to the external side 40 of the door panel 34. The spring loaded captive screw 74 can be multiple spring loaded captive screws 74 coupling the snubber plate 60 to the door panel 34 at multiple locations, including but not limited to four locations 80 along the vertical panel 64 and two locations 80 on the label plate 70.

Figure 4:
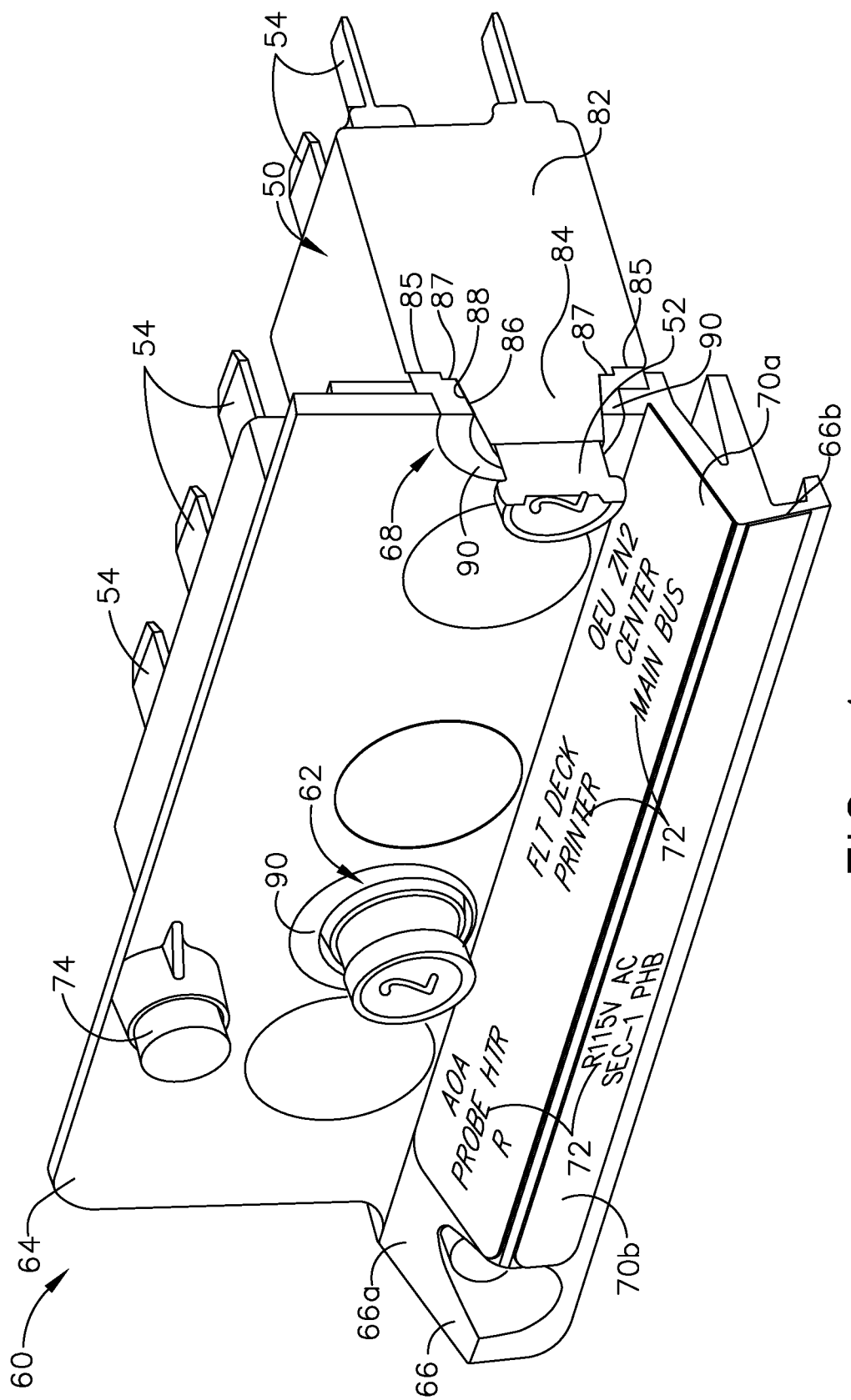
FIG. 4 is a partial cross-sectional isometric view of the snubber plate and circuit breakers from the power distribution unit of FIG. 3.

An enlarged partially cross-sectioned isometric view of the snubber plate 60 in register with the circuit breakers 50 is illustrated in FIG. 4. In the exemplary illustration, a single circuit breaker 50 carries up to three loads and has a three phase plug in. It is further contemplated that a single circuit breaker 50 can carry a single load, having a single phase plug in. The pitch of the opening 56 can vary with the number of phases or type of plug in circuit breaker 50. The amount of loads or phases carried by each of the circuit breakers 50 can vary and is dependent on the capacity of the circuit breaker 50 and the amount of the load.

The snubber plate 60 can be a molded part manufactured from a thermal resistant material. It is also contemplated that the snubber plate 60 is formed from a metal and the snubber plate 60 can conduct heat away from the circuit breakers. The snubber plate 60 is therefore not limited to one type of material.

The horizontal panel 66 can include a sloped upper surface 66a and a substantially vertical base 66b. The sloped upper surface 66a can include an upper label plate 70a and the vertical base 66b can include a lower label plate 70b. As illustrated, the indicia 72 can indicate the load to which the circuit breaker 50 is connected. For example, circuit breaker "2" carries the "AOA probe heater" and the "Flight deck printer". The lower label plate 70b can include indicia 72 indicating the type of load carried by the circuit breaker "2", which in the exemplary illustration is 115 V AC.

A body 82 of the circuit breaker 50 terminates in a conical portion 84 having a conical face 86 at the aperture 62. The conical portion 84 is circumscribed by a front face 85 of the circuit breaker 50. Between the conical portion 84 and the front face 85 a shoulder 87 is formed.

The grommet 68 comprises a sloped edge 88 tapered to approximate a sloping angle of the conical portion 84. A raised portion 90 of the grommet 68 extends through the aperture 62 such that the raised portion 90 is visible at the vertical panel 64. The grommet 68 can be bonded directly to the snubber plate 60.

The grommet 68 is more clearly illustrated in FIG. 5A. A mold 92 of three grommets 68 is shown in an isometric view. The mold 92 can include three grommets 68 as illustrated each having the second aperture 69 through which the circuit breaker 50 can extend. It is further contemplated that the mold 92 is formed with more or less grommets 68. Each grommet 68 includes the raised portion 90 extending from a front face 91. A stepped portion 93 can extend from a back face 95.

Turning to FIG. 5B the stepped portion 93 can be multiple castellations 94 arranged outside of the second aperture 69. The mold 92 can be made from, by way of non-limiting example, a temperature rated rubber/silicone material. The material can have a shore hardness of 40 to 60 giving a recoverable aspect to the grommet 68.

Other possible arrangements of the stepped portion 93 are also contemplated. FIG. 6 illustrates a mold 192 for grommets 168 having a stepped portion 193 with a plurality of castellations 194 arranged in a semi-circular pattern.

FIG. 7 illustrates another mold 292 for grommets 268 having a semi-circular stepped portion 293 surrounding a second aperture 269 of the grommet 268. The grommets 68, 168, 268 described herein are for illustrative purposes only and not meant to be limiting.

Figure 8:
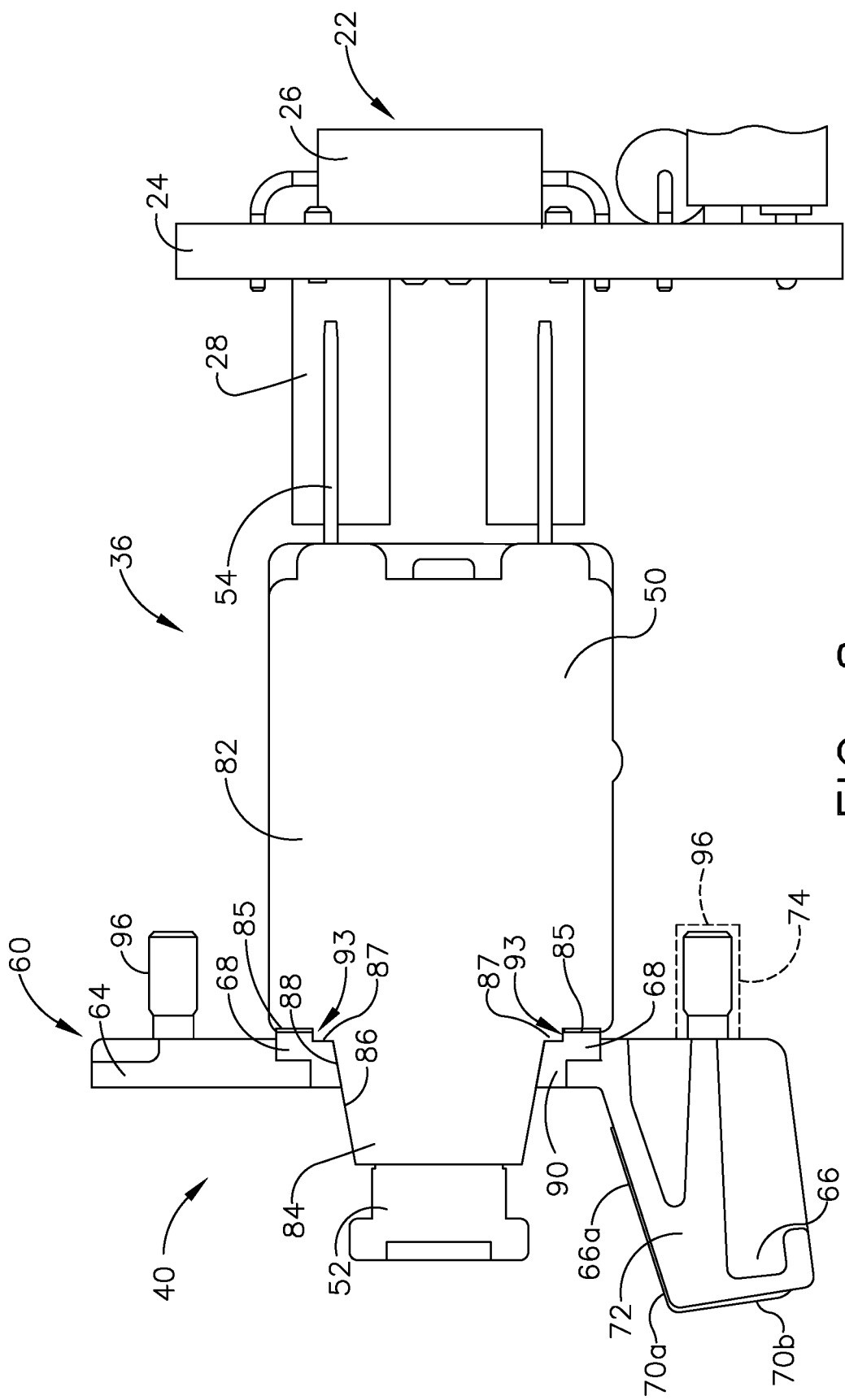
FIG. 8 is an assembled cross-sectional view of the snubber plate, circuit breakers, and a PCB for the power distribution unit of FIG. 3.

Turning to FIG. 8, a cross-sectional view of the snubber plate 60 with the circuit breaker 50 plugged into the PCB 24 is illustrated. A method of managing circuit breakers 50 in the power distribution system unit 14 described herein includes mounting the set of circuit breakers 50 with a plug 54 into the PCB 24 that includes the circuit breaker socket 28. The method further includes mounting the set of PCBs 24 to the internal side 36 of the door panel 34 with the conical portion 84 of the circuit breaker 50 extending through the external side 40 of the door panel. Upon mounting both the circuit breakers 50 and the PCBs 24, the snubber plate 60 is secured to the external side 40 with the conical portion 84 extending through the aperture 62 in the snubber plate 60 and the grommet 68 secured to the snubber plate 60.

The spring loaded captive screws 74 can be unscrewed to remove the snubber plate 60 allowing access to the PCB 24, including components 26 plugged into the PCB 24, by way of non-limiting example the circuit breakers 50. The method can further include coupling the set of PCBs 24 to a bus structure 22 as described herein.

The method can further include engaging and surrounding a shoulder 87 adjacent the conical portion 84 with the stepped portion 90 of the grommet 68. As can more clearly be seen, the conical face 86 of the body 82 of the circuit breaker 50 abuts the sloped edge 88 of the grommet 68. The sloped edge 88 feature of the grommet 68 enables mating via the conical face 86 of the circuit breaker to aid in a reduction of fretting between the circuit breaker 50 and the snubber plate 60. The grommet 68 retains the circuit breaker 50 on the conical face 86 and the front face 85 of the circuit breaker 50 with the stepped portion 93 as described herein. A multiple surface contact of the grommet 68 with the circuit breaker 50 retains the circuit breaker 50 both concentrically and in an x, y, z axis.

The contact between the grommet 68 and the shoulder 87 enables a constant perpendicular force against the PCB 24. The method can further include rotating the spring loaded captive screws 74 into compression limiters 96 to secure the circuit breaker 50 in a fixed position while in operation eliminating material creep and minimizing fretting. The sloped upper surface 66a provides a run-off feature for any moisture accumulation on the snubber plate 60.

The method can further include adjoining the label plate 70 with corresponding indicia 72 to the set of circuit breakers 50 as described herein. The label plate 70 can adhere to the horizontal panel 66 of the snubber plate 60 at both the sloped upper surface 66a and the vertical base 66b.

Aspects of the disclosure as described herein provide a power distribution system unit with plug in circuit breakers that are easily replaced or maintained. Plug in circuit breakers provide a decrease in total unit cost and reduce initial assembly times and maintenance costs. Incorporating PCBs within the electrical make-up of the power distribution system unit disclosed herein saves labor costs upon assembly as well as decreases weight and maintenance needs and increases functionality and adjustability.

The snubber plate in particular can be removed/replaced without specialized tooling. Quick access to the interior without opening the door and disconnecting wiring will greatly reduce maintainability including both replacement and retest of electrical circuits.

Additionally the snubber plate reduces the need for mechanical fasteners in a power distribution system unit. Eliminating metal to metal contact prevents any conductive dust-like material from forming and potentially causing electronics to short circuit. Additionally minimizing fretting can decrease the resistance over the electrical joint between the circuit breaker and the PCB minimizing unwanted high operational temperatures.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the present disclosure, including the best mode, and to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system unit comprising:
   a housing with an internal bus structure;
   a door assembly hinged to the housing and having an internal side and an external side wherein the internal side is accessible when the door assembly is in an open position and is inaccessible when the door assembly is in a closed position;
   the door assembly having:
      a set of printed circuit boards (PCBs) mounted to the internal side, the set of PCBs having at least one socket;
      a set of circuit breakers having an operator in a conical portion and at least one plug disposed opposite the operator;
      the at least one plug received in the at least one socket and the conical portion extending through the external side; and
      a snubber plate having at least one aperture and a grommet surrounding the at least one aperture, and secured to the external side;
   wherein the conical portion extends through the at least one aperture in the snubber plate and retained therein by the grommet.

2. The power distribution system unit of claim 1 wherein the snubber plate includes a rank of apertures and the set of circuit breakers includes a plurality of circuit breakers arranged to be in registry with the rank of apertures.

3. The power distribution system unit of claim 2 further comprising a label plate adjoining the rank of apertures that carries indicia corresponding to the set of circuit breakers.

4. The power distribution system unit of claim 1 further comprising a set of spring loaded captive screws that secures the snubber plate to the external side.

5. The power distribution system unit of claim 1 wherein the set of circuit breakers has a shoulder adjacent the conical portion and the grommet has a stepped portion dimensioned to engage and surround the shoulder and the stepped portion abuts a front face of the circuit breaker.

6. The power distribution system unit of claim 1 wherein the grommet is tapered to approximate a sloping angle of the conical portion and the sloping angle forms a sloped edge that abuts the conical portion.

7. The power distribution system unit of claim 1 wherein the at least one aperture in the snubber plate is a plurality of apertures and the grommet has a set of apertures corresponding to the plurality of apertures.

8. A door assembly for a power distribution system unit comprising:
   a panel having an internal side and an external side;
   a set of printed circuit boards (PCBs) mounted to the internal side, the set of PCBs having at least one socket;
   a set of circuit breakers having an operator in a conical portion and at least one plug disposed opposite the operator;
   the at least one plug received in the at least one socket and the conical portion extending through the external side; and
   a snubber plate having at least one aperture and a grommet surrounding the at least one aperture, and secured to the external side;
   wherein the conical portion extends through the at least one aperture in the snubber plate and retained therein by the grommet.

9. The power distribution system unit door assembly of claim 8 wherein the snubber plate includes a rank of apertures and the set of circuit breakers includes a plurality of circuit breakers arranged to be in registry with the rank of apertures.

10. The power distribution system unit door assembly of claim 9 further comprising a label plate adjoining the rank of apertures that carries indicia corresponding to the set of circuit breakers.

11. The power distribution system unit door assembly of claim 8 further comprising a set of spring loaded captive screws that secures the snubber plate to the external side.

12. The power distribution system unit door assembly of claim 8 wherein the set of circuit breakers has a shoulder adjacent the conical portion and the grommet has a stepped portion dimensioned to engage and surround the shoulder and the stepped portion abuts a front face of the circuit breaker.

13. The power distribution system unit door assembly of claim 8 wherein the grommet is tapered to approximate a sloping angle of the conical portion and the sloping angle forms a sloped edge that abuts the conical portion.

14. The power distribution system unit door assembly of claim 8 wherein the at least one aperture in the snubber plate is a plurality of apertures and the grommet has a set of apertures corresponding to the plurality of apertures.

15. A method of managing circuit breakers in a power distribution system unit, comprising:
   mounting a set of circuit breakers having an operator in a conical portion and at least one plug disposed opposite the operator to a set of printed circuit boards (PCBs) having at least one socket by receiving the at least one plug in the at least one socket;
   mounting the set of PCBs to an internal side of a door panel with the conical portion extending through an external side of the door panel; and
   securing a snubber plate to the external side, the snubber plate having at least one aperture and a grommet surrounding the at least one aperture, with the conical portion extending through the at least one aperture in the snubber plate and retained therein by the grommet.

16. The method of claim 15 further comprising engaging and surrounding a shoulder adjacent the conical portion with stepped portion on the grommet.

17. The method of claim 15 further comprising adjoining a label plate that carries indicia corresponding to the set of circuit breakers to the snubber plate.

18. The method of claim 15 wherein the grommet is tapered to approximate a sloping angle of the conical portion.

19. The method of claim 15 wherein the securing is accomplished by rotating a set of spring loaded captive screws.

20. The method of claim 15 further comprising coupling the set of PCBs to a bus structure.

* * * * *